United States Patent [19]

Okada

[11] Patent Number: 5,757,515
[45] Date of Patent: May 26, 1998

[54] IMAGE PROCESSING METHOD AND APPARATUS

[75] Inventor: Masaaki Okada, Toda, Japan

[73] Assignee: Canon Kabushiki Kaisha, Tokyo, Japan

[21] Appl. No.: 515,130

[22] Filed: Aug. 15, 1995

[30] Foreign Application Priority Data

Aug. 19, 1994 [JP] Japan .................................. 6-195265

[51] Int. Cl.⁶ .................................................. H04N 1/40
[52] U.S. Cl. .................................. 358/461; 382/274
[58] Field of Search .............................. 358/461, 455, 358/456, 448, 404, 444; 382/263, 264, 274

[56] References Cited

U.S. PATENT DOCUMENTS

| | | | |
|---|---|---|---|
| 5,062,144 | 10/1991 | Murakami | 358/461 |
| 5,091,789 | 2/1992 | Haneda et al. | 358/401 |
| 5,253,083 | 10/1993 | Hirota | 358/461 |
| 5,325,210 | 6/1994 | Takashima et al. | 358/461 |
| 5,398,119 | 3/1995 | Suzuki | 358/461 |
| 5,455,690 | 10/1995 | Ishikawa | 358/461 |

FOREIGN PATENT DOCUMENTS

| | | | |
|---|---|---|---|
| 0119270 | 7/1983 | Japan | 358/461 |
| 0121864 | 7/1983 | Japan | 358/461 |
| 0213552 | 12/1983 | Japan | 358/461 |
| 0254876 | 12/1985 | Japan | 358/461 |

*Primary Examiner*—Thomas D. Lee
*Assistant Examiner*—Jerome Grant, II
*Attorney, Agent, or Firm*—Morgan & Finnegan, LLP

[57] ABSTRACT

An image reading apparatus can perform shading correction with a simple arrangement. Prior to an original read operation, a prescanning operation is performed using a white reference original. Shading data is formed by a shading correction circuit and held in both an internal shading memory and a memory in a shading data confirming unit. The shading data confirming unit compares the data in both the memories to detect whether the data is destroyed. If the data is destroyed, permanent shading data is used. When the image is a halftone image, the prescanning operation is performed again to form shading data. Therefore, a conventionally used prescanning mechanism for the reference white ground can be omitted. At the same time, even when the shading data is destroyed by an abnormal voltage or the like, processing can be normally performed.

16 Claims, 9 Drawing Sheets

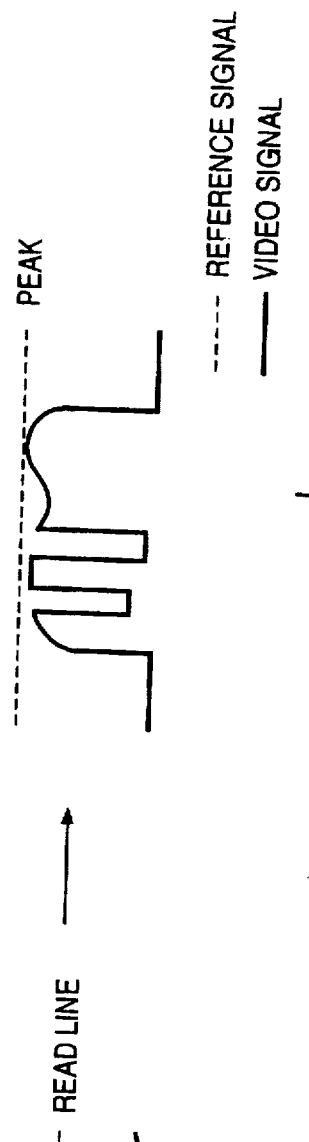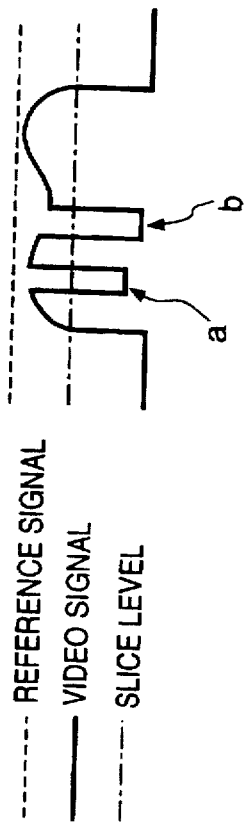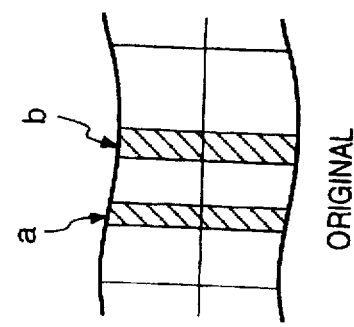

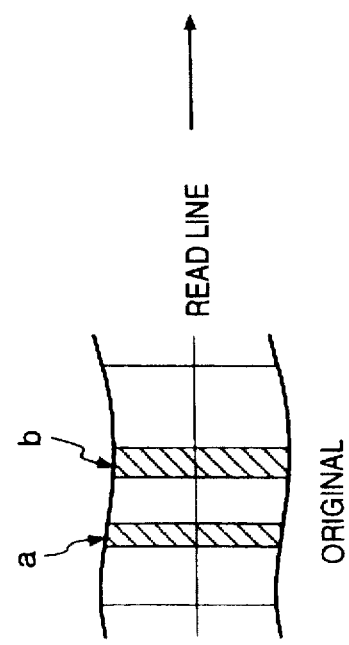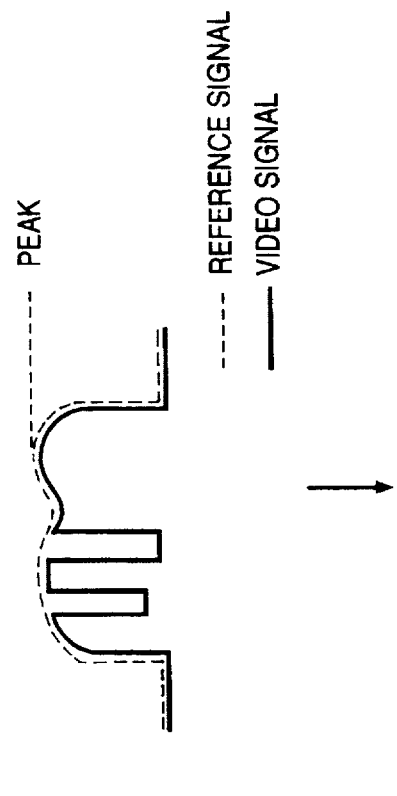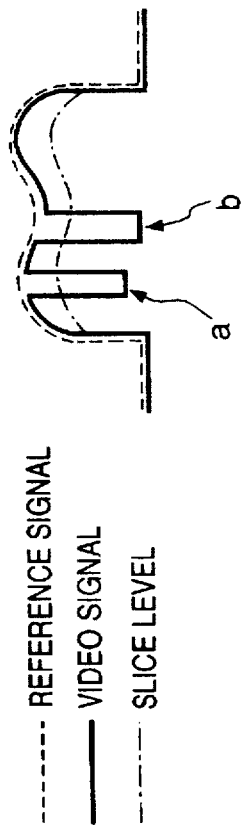

IMAGE PROCESSING METHOD AND APPARATUS

BACKGROUND OF THE INVENTION

The present invention relates to an image processing apparatus preferably used for a facsimile apparatus or the like, which reads an original image by an image sensor and electrically processes the read image.

FIG. 6 is a block diagram showing a general image reading processing apparatus. This apparatus uses a CCD sensor as an image sensor.

Referring to FIG. 6, a CCD sensor 2 converts the light amount of a read original image into an electric amount. A driver circuit 4 supplies a clock signal for driving the CCD sensor 2. An amplifier 6 amplifies an output from the CCD sensor 2 to an appropriate level. A sample hold circuit 8 extracts only an output portion corresponding to the original image from an output signal output from the CCD sensor 2 in units of bits (pixels). A DC reproducing circuit 10 causes the black output level of the original image to coincide with the bias voltage of each processing circuit at the subsequent stage in correspondence with the sample-held signal.

A peak hold ABC circuit 12 detects the peak value of an output in reading one line, thereby binarizing image data in consideration of the density of the background of the original image (such processing is called ABC: AUTO BACKGROUND CONTROL). A shading correction circuit 14 electrically corrects the nonuniformity (called shading distortion) of an output signal, which is caused by variations in photosensitivity of the CCD sensor 2 or an offset of the read mechanism. An A/D converter 16 uses a reference signal generated by the peak hold ABC circuit 12 and the shading correction circuit 14 to binarize a video signal DC-reproduced by the DC reproducing circuit 10 and output image data.

A read control unit 18 manages and controls the clock timing or control signal timing at each of the above portions, finally receives the image data binarized by the A/D converter 16, and processes the image. An MPU 19 controls the read control unit 18, and at the same time, controls the entire system.

FIG. 7 is a circuit diagram showing the peak hold ABC circuit 12 and the shading correction circuit 14 in FIG. 6 in detail.

Referring to FIG. 7, a video signal 24 is supplied from the DC reproducing circuit 10 in FIG. 6. Voltage-dividing resistors 26 and 28 voltage-divide the supplied video signal 24. An analog switch 30 is closed in a range of ABC processing. A comparator 32 compares the supplied video signal with a current peak value. A charge resistor charges a peak hold capacitor 38. An analog switch 36 is closed when the peak hold capacitor 38 is to be charged. The peak hold capacitor 38 holds the peak value of the video signal. A discharge resistor 40 discharges the peak hold capacitor 38. The peak value held by the peak hold capacitor 38 appears at a point 42 (to be referred to as the peak value 42 hereinafter).

A buffer amplifier 44 buffers the peak value 42. A charge resistor 45 charges a shading capacitor 52. An analog switch 46 is closed when the shading capacitor 52 is to be charged. An analog switch 48 is closed when the shading capacitor 52 is to be discharged. An inverter 50 inverts a memory readout data signal 59. A discharge resistor 54 discharges the shading capacitor 52.

A comparator 56 compares the video signal 24 with a reference signal 60. A memory write data signal 57 corresponds to output data from the comparator 56. A shading memory 58 accumulates shading correction data. The memory readout data signal 59 opens/closes the analog switches 46 and 48 in accordance with the shading correction data.

The reference signal 60 appears at the shading capacitor 52, which is connected to the REF input terminal of the A/D converter 16 in FIG. 6.

An ABC range signal 62 is a control output signal from the read control unit 18 in FIG. 6, which is turned on in a range of ABC processing.

A memory control signal 64 is a control output signal from the read control unit 18 in FIG. 6, which controls write/read access to the shading memory 58.

An analog switch 66 switches an input signal to the (−) input terminal of the comparator 32 between the peak value signal 42 and the reference signal 60. A switch changeover signal 68 is a control output signal from the read control unit 18 in FIG. 6, which switches the analog switch 66.

The read operation in FIGS. 6 and 7 will be described below. Prior to the read operation of the original image of one page, a prescanning operation as a read operation of read white ground (reference white ground) provided in the apparatus is performed to store a shading waveform for shading correction.

More specifically, in FIG. 7, the analog switch 30 is closed in accordance with the ABC range signal 62, and the video signal 24 is supplied to the (+) input terminal of the comparator 32. On the other hand, the analog switch 66 is set to the peak value 42 side in accordance with the switch changeover signal 68. For this reason, the held peak value 42 is supplied to the (−) input terminal of the comparator 32, and the two signals are compared with each other. If (video signal 24)>(peak value 42), the analog switch 36 is closed, and the peak hold capacitor 38 is charged through the charge resistor 34 to increase the peak value 42. To the contrary, if (video signal 24)<(peak value 42), the analog switch 36 is kept open, so the peak value 42 is unchanged. As a result, the peak value 42 finally coincides with the peak value of the video signal 24.

The peak value 42 is transmitted to the subsequent circuits through the buffer amplifier 44. The comparator 56 compares the video signal 24 supplied to the (+) input terminal with the reference signal 60 supplied to the (−) input terminal. If (video signal 24)>(reference signal 60), the comparator output 57 is at level "1" (high). If (video signal 24)<(reference signal 60), the output is at level "0" (low).

In this prescanning mode, the comparator output 57 is written in the memory 58 in accordance with the memory control signal 64, and at the same time, output as the memory readout data signal 59. If this memory readout data signal 59 is at level "1" (high), the analog switch 46 is closed while the analog switch 48 is opened. For this reason, the shading capacitor 52 is charged through the buffer amplifier 44 and the charge resistor 45 in accordance with the peak value 42. To the contrary, when the memory readout data signal 59 is at level "0" (low), the analog switch 46 is opened while the analog switch 48 is closed. Therefore, the shading capacitor 52 is discharged through the discharge resistor 54.

When charging/discharging of the shading capacitor 52 is repeated, a waveform corresponding to the video signal waveform of the current read line, which is approximated with charging/discharging of the shading capacitor 52, appears on the reference signal 60. Simultaneously, data for charging/discharging the shading capacitor 52, i.e., charging/discharging data (shading data) is accumulated in the memory 58. Normally, since charging of the peak hold capacitor 38 with the peak value 42 is time-consuming, the above prescanning operation is repeated for several lines, thereby obtaining shading data. Although the shading memory 58 can be backed up, it is not connected to the data bus of the entire system, so the MPU 19 cannot be directly accessed. Therefore, the memory 58 cannot be protected.

FIGS. 8A and 8B are views schematically showing the prescanning operation of the read white ground (reference white ground), and a shading waveform obtained by this operation and including variations in light amount of a read light source, or variations in sensitivity of the read sensor.

The actual original read operation will be described below.

The analog switch 30 is closed with respect to the original width in accordance with the ABC range signal 62 within the range of ABC processing. In this example, it is assumed that (original width)=(ABC range), and the analog switch 30 is closed during the original read operation. Therefore, the original read video signal 24 is supplied to the (+) input terminal of the comparator 32. During the original read operation, the analog switch 66 is set to the reference signal 60 side in accordance with the switch changeover signal 68. The video signal 24 is supplied to the (+) input terminal of the comparator 32 while the reference signal 60 is supplied to the (−) input terminal. By comparing the two signals with each other, the analog switch 36 is closed or opened, as described above. As a result, the operation is performed such that the video signal 24 coincides with the reference signal 60.

The shading correction data accumulated in units of read lines during the prescanning operation is read out from the shading memory 58 in synchronism with each line in accordance with the memory control signal 64. In accordance with level "1" (high) or "0" (low) of the shading correction data, the analog switches 46 and 48 are opened/ closed to charge/discharge the shading capacitor 52. With this operation, the shading waveform obtained during the prescanning operation is reproduced on the reference signal 60.

The reference signal 60 obtained in the above manner is supplied to the reference input terminal (REF) of the A/D converter 16 in FIG. 6 while the video signal is supplied to the analog input terminal (Vin) of the A/D converter 16. As a result, accurate binary image data which is shading-corrected can be obtained and sent to the read control unit 18.

Therefore, in an original having portions a and b with black information as shown in FIG. 9A, the reference signal and the video signal as shown in FIG. 9B are obtained in the original read operation. In the read control unit 18 in FIG. 6, if the slice level is set to 60% of the reference signal level, as shown in FIG. 9C, the portions a and b are set at levels lower than the slice level and therefore determined as black information portions.

When the above operation is repeated every line in the subscanning direction, an original of one page is read.

In the above-described image reading apparatus, the read mechanism for the prescanning operation of the read white ground (reference white ground) is generally arranged in the apparatus, resulting in a complex arrangement. Prior to the read operation of each original, the read operation for the prescanning operation is performed. For this reason, the reliability of original feeding (e.g., ADF "Auto Document Feeder") is not so high. To solve this problem, an image reading apparatus which permanently uses shading data obtained in one prescanning operation and held in the shading memory is also proposed. In such an image reading apparatus, however, if internal data in the shading memory is destroyed by an abnormal voltage (e.g., thunder surge or static electricity), no normal halftone image can be obtained.

SUMMARY OF THE INVENTION

The present invention has been made in consideration of the above situations, and has as its object to provide an image processing method and apparatus capable of omitting a mechanism for a prescanning operation using a reference white ground in an image reading apparatus or the like.

It is another object of the present invention to provide an image processing method and apparatus capable of determining whether held shading data is destroyed before the held shading data is used.

It is still another object of the present invention to provide an image processing method and apparatus which allow to continuously execute image processing even if destruction of held data is detected.

It is still another object of the present invention to provide an image processing method and apparatus which allow to set a prescanning mode for forming shading data even if destruction of held shading data is detected, thereby improving the operability.

It is still another object of the present invention to provide an image processing method and apparatus which allow to store data for comparison for confirming whether shading data is destroyed in a protect memory, thereby properly confirming the consistency of the shading data.

In order to achieve the above objects, according to the present invention, there is provided an image processing apparatus used for an image reading processing apparatus for processing an image signal obtained by reading an original by a line sensor. This apparatus has a prescanning mode wherein, prior to an original read operation, a white reference original is read by the line sensor to form shading data. The shading data obtained in the prescanning mode is held in a shading memory. Image processing is performed using the shading data in the shading memory and the image signal obtained by reading the original.

According to the above arrangement, by setting the prescanning mode, the white reference original can be read by a normal read operation, thereby forming and holding the shading data. Therefore, a mechanism for the prescanning operation of the read white ground (reference white ground) is omitted, and only the original read mechanism is provided. To form shading data, an original as a white reference is read, and output data at this time is held in the shading memory as shading data.

According to the present invention, in an image processing apparatus for processing an image signal obtained by reading an original by a line sensor, confirming means for confirming whether shading data in a shading memory is destroyed is provided. When the shading data is not destroyed, image processing is executed using the shading data in the shading memory and the image signal obtained by reading the original. On the other hand, when the shading data is destroyed, image processing is performed using a predetermined value for the shading data.

According to the above arrangement, if destruction of the shading data in the shading memory is detected, and it is determined that the data is destroyed, a predetermined value (e.g., the peak value of the image) is used in place of the shading data. Therefore, processing capable of being executed using the predetermined value can also be continued even if the shading data is destroyed.

According to the present invention, in an image processing apparatus for processing an image signal obtained by reading an original having a halftone image by a line sensor, means for confirming whether shading data in the shading memory is destroyed, and, when the shading data is destroyed, executing formation of shading data in the prescanning mode again is provided.

According to the above arrangement, if the data is destroyed in reading the halftone image, the prescanning mode is set again, thereby forming new shading data and writing the data in the shading memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3C are views showing a reference signal and a slice level in use of fixed shading data according to the embodiment;

FIGS. 9A to 9C are views for explaining the operation of the general image reading apparatus.

DETAILED DESCRIPTION OF THE PREFERRED EMBODIMENT

Preferred embodiments of the present invention will now be described in detail in accordance with the accompanying drawings.

Figure 1:
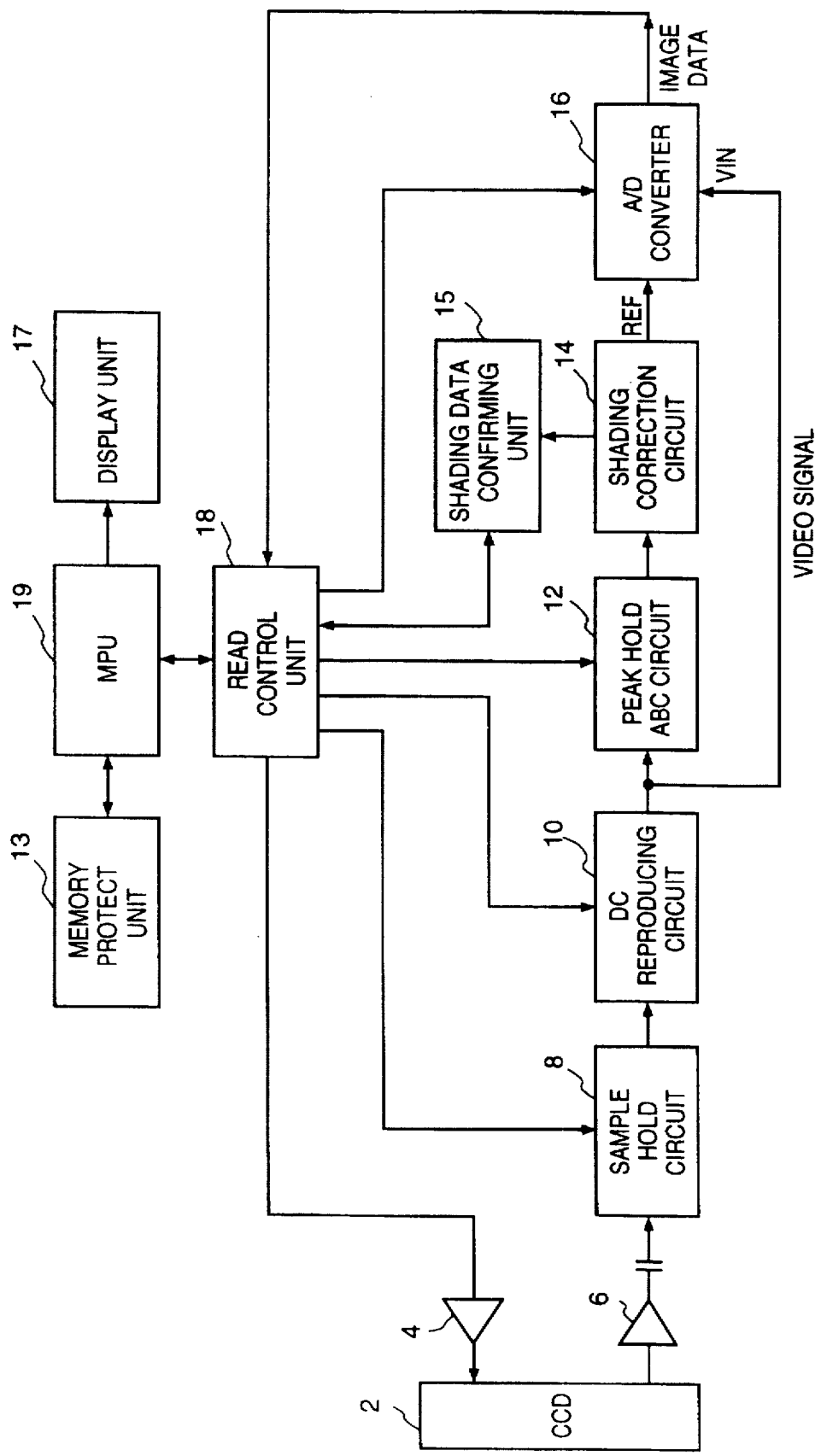
FIG. 1 is a block diagram showing the control arrangement of an image reading apparatus according to an embodiment.

FIG. 1 is a block diagram showing the control arrangement of an image reading apparatus according to an embodiment.

Figure 6:
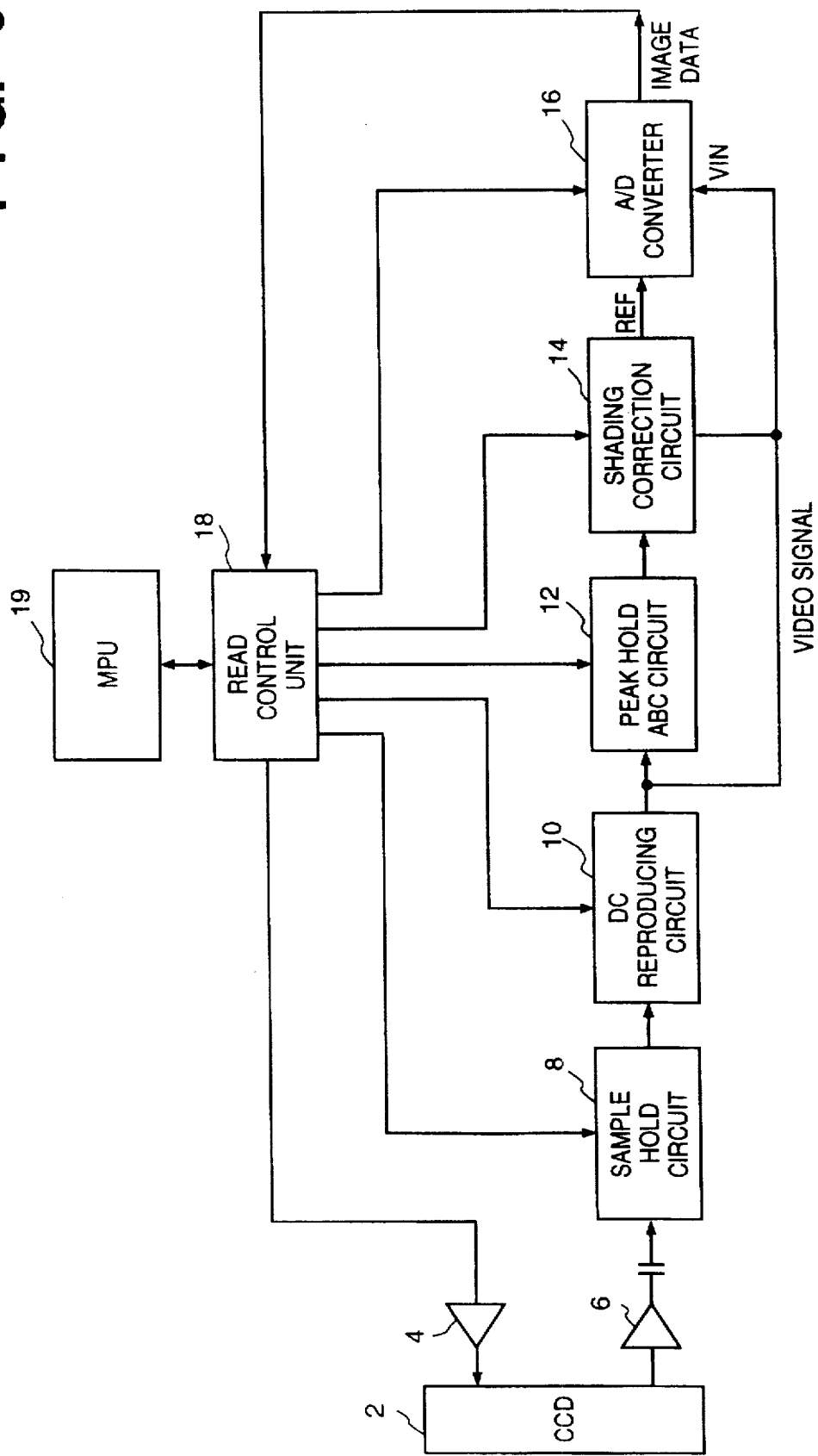
FIG. 6 is a block diagram showing the control arrangement of a general image reading apparatus.

The same reference numerals as in FIG. 6 denote the same elements in FIG. 1, and a detailed description thereof will be omitted. However, the read CCD sensor 2 is replaced with a CS (contact sensor) 2 because this embodiment is mainly an improvement of performance to an equal-size read sensor. A shading data confirming unit 15 is additionally arranged for this embodiment, which confirms, prior to the original read operation, whether shading data in a shading memory is destroyed and inputs the result to a read control unit 18. A memory protect unit 13 protects the memory in the shading data confirming unit 15 (prevents a chip select signal from outputting to the memory). A display unit 17 uses a liquid crystal or the like.

Figure 2:
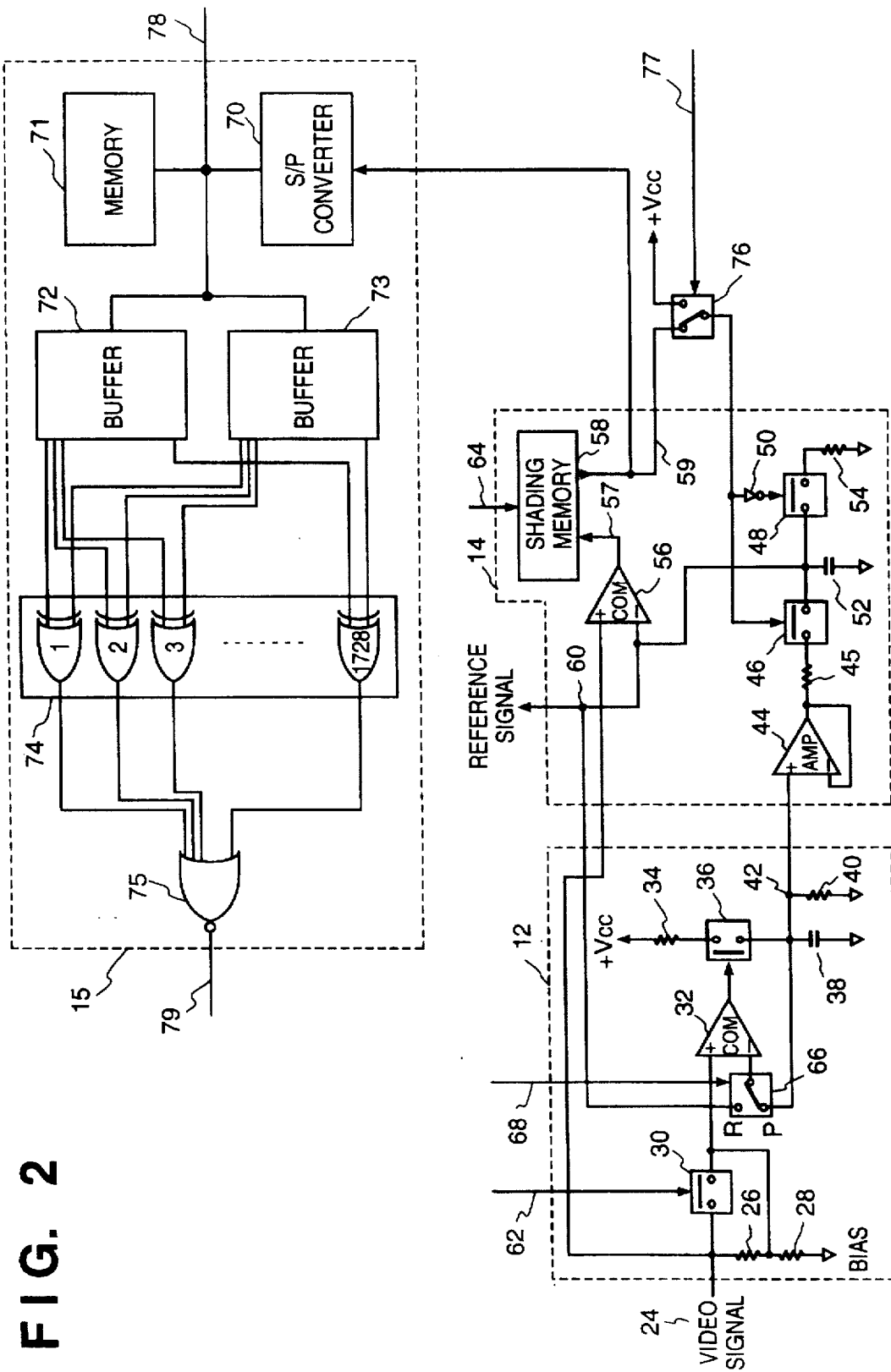
FIG. 2 is a circuit diagram showing the arrangement of a peak hold ABC circuit, a shading correction circuit, and a shading data confirming unit according to the embodiment.
Figure 7:
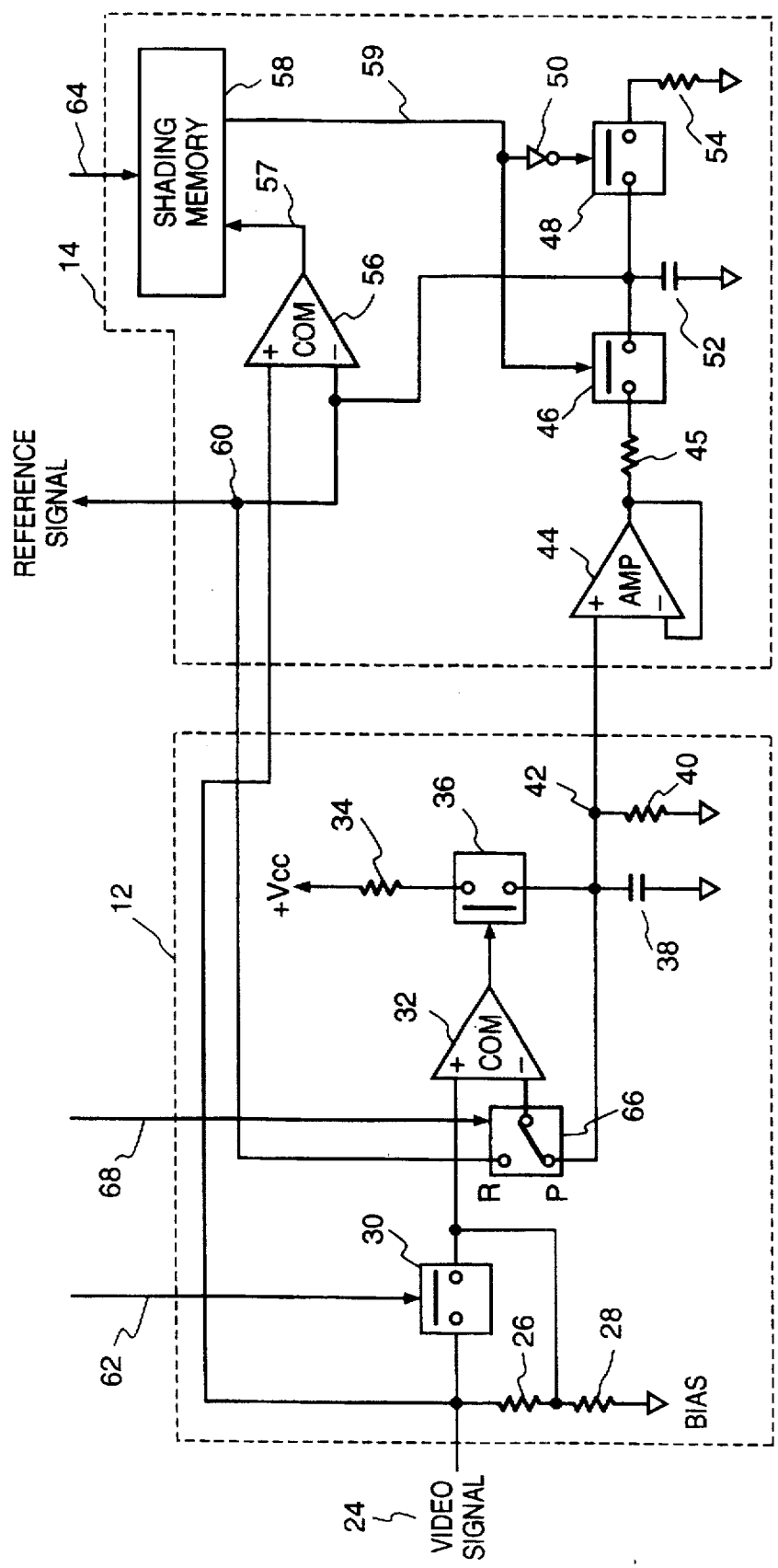
FIG. 7 is a circuit diagram showing the arrangement of a general peak hold ABC circuit and a general shading correction circuit.
Figure 8A:
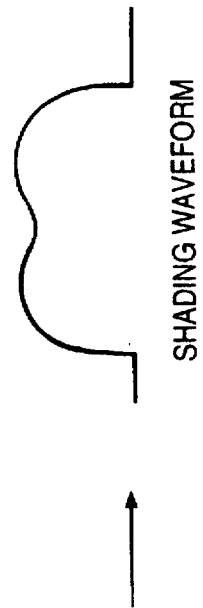
FIG. 8A is a view for explaining a general prescanning operation.
Figure 8B:
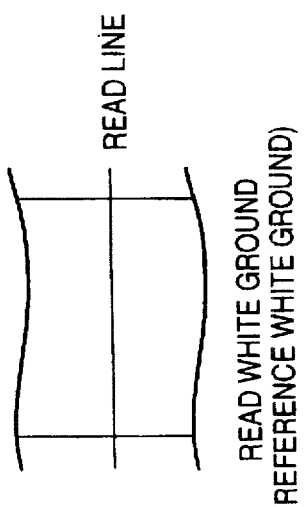
FIG. 8B is a graph showing a shading waveform obtained by the prescanning operation in FIG. 8A.

FIG. 2 is a circuit diagram showing the circuit arrangement of a peak hold ABC circuit 12, a shading correction circuit 14, and the shading data confirming unit 15. The same reference numerals as in FIG. 7 denote the same elements in FIG. 2, and a detailed description thereof will be omitted.

In the shading data confirming unit 15, a serial-to-parallel (S/P) converter 70 receives shading data as serial data and outputs it as 8-bit parallel data. A memory 71 can be protected by the memory protect unit 13 in FIG. 1 such that the internal data is not destroyed even in a case of runaway of software. The memory 71 stores the shading data. An 8-bit data bus 78 is connected to the entire system including an MPU 19 in FIG. 1.

Buffers 72 and 73 temporarily hold data when data in the memory 71 is compared with data in a shading memory 58. The buffer 72 holds data in the memory 71 while the buffer 73 holds data in the shading memory 58. The data in the buffers 72 and 73 are compared by 1,728 (number of main-scanning-direction pixels of image data read by this apparatus) XOR gates 74. A NOR gate 75 outputs comparison results from the XOR gates 74 to the read control unit 18 in FIG. 1 as a determination result signal 79.

An analog switch 76 switches between the shading data and a signal +VCC (1; high) in accordance with a shading data switching signal 77 from the read control unit 18 and supplies the data to analog switches 46 and 48.

The MPU 19, the read control unit 18, and the shading correction circuit 14 realize prescanning control while the MPU 19 and the read control unit 18 realize image processing control.

Figure 4:
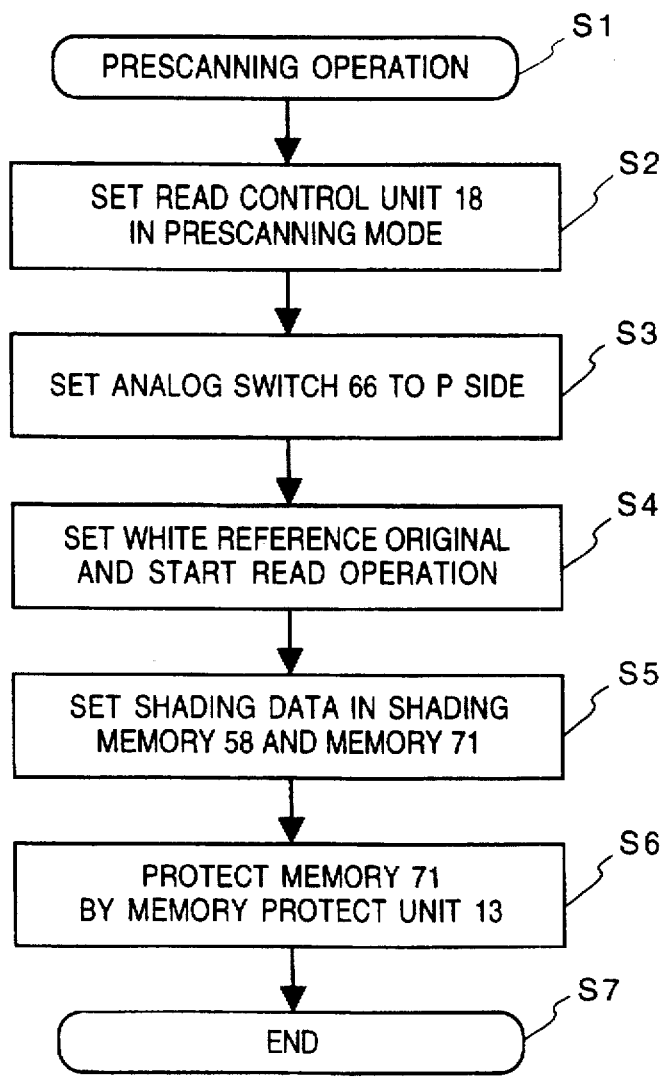
FIG. 4 is a flow chart showing a prescanning operation of the embodiment.

The operation of the image reading processing apparatus of this embodiment will be described below with reference to the circuit arrangement shown in FIG. 2 and a flow chart in FIG. 4.

The prescanning operation for forming shading data from step S1 will be described. This prescanning operation is executed in a prescanning mode. When the read control unit 18 in FIG. 1 is set in the prescanning mode in step S2, the analog switch 66 is set to the P side in step S3. In step S4, a white reference original is read. With this read operation, a video signal is output from the sensor (CS) 2, DC-reproduced by a DC reproducing circuit 10, and supplied to the peak hold ABC circuit 12 as a video signal 24. Note that the prescanning mode can be manually set using an operation panel (not shown).

In step S5, the comparison result between a reference signal 60 corresponding to a peak value 42 of the video signal 24 and the video signal 24 (i.e., shading data) is written in the shading memory 58. The shading data is simultaneously output as a memory readout data signal 59 and supplied to the S/P converter 70 in the shading data confirming unit 15. The shading data as serial data is converted into parallel data and input to the memory 71. The memory 71 stores the shading data.

When the read operation of the white reference original is completed, and the shading data is completely written in the memory 71 in step S6, the prescanning mode is ended. In step S6, the memory 71 is set in a memory protect state by the memory protect unit 13 in FIG. 1. thereby ending processing in step S7.

Figure 5:
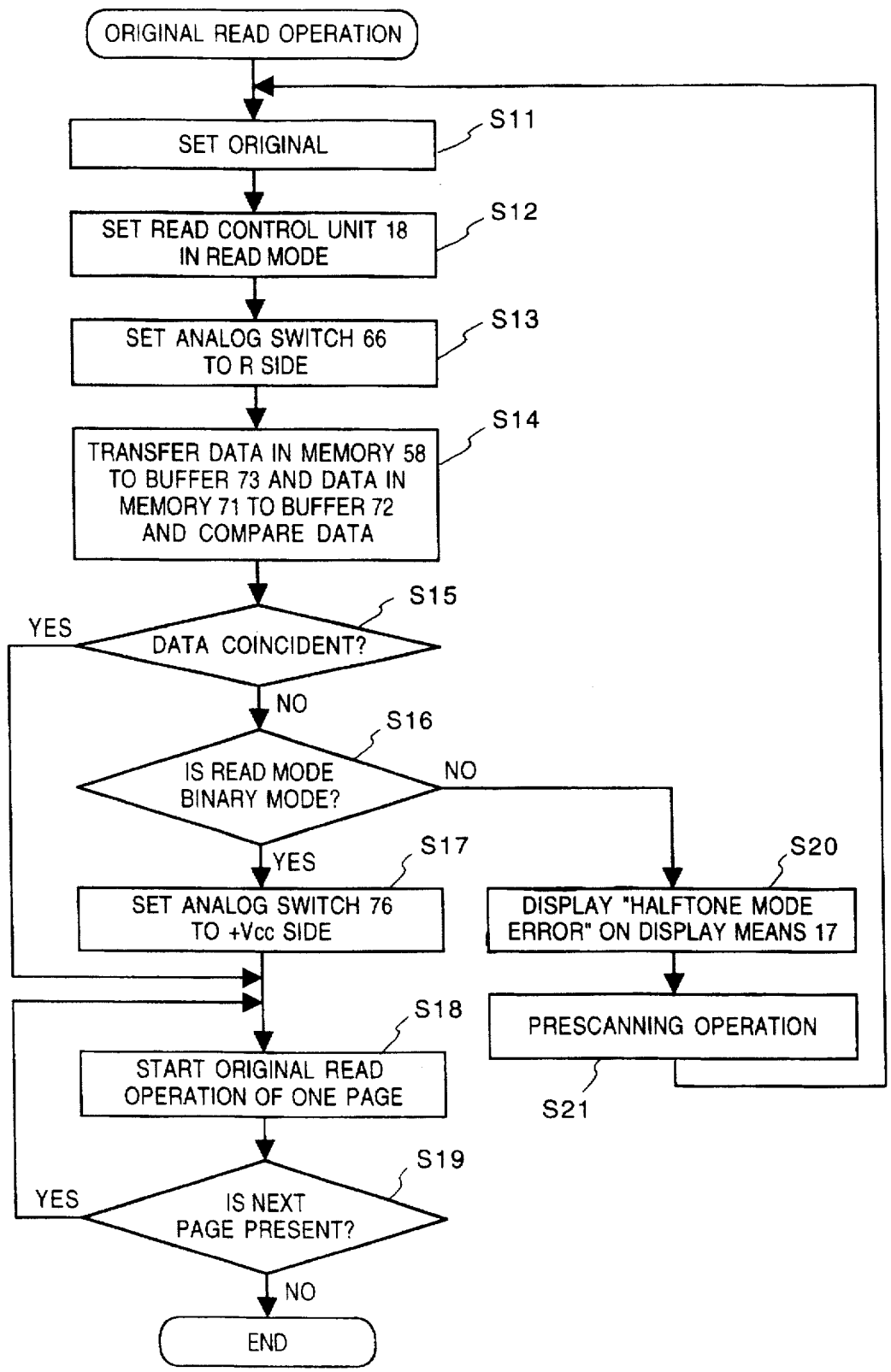
FIG. 5 is a flow chart showing an original read operation of the embodiment.

An operation of confirming whether the data in the shading memory 58 is destroyed will be described below with reference to a flow chart in FIG. 5. This operation is always performed prior to the original read operation.

When an original is set in step S11, the read control unit 18 in FIG. 1 is set in a read mode in step S12, and the analog switch 66 is set to the R side in step S13. In step S14, the data in the shading memory 58 is compared with the data in the memory 71. When the read control unit 18 outputs a memory control signal 64, the shading data is output from the shading memory 58 as the memory readout data signal 59 in accordance with the signal 64. This shading data is converted into parallel data by the S/P converter 70 and held in the buffer 73. The shading data in the memory 71 is also transferred to the buffer 72.

The shading data in the buffers 72 and 73 are checked by the 1,728 XOR gates 74 in units of bits from the first bit to the 1728th bit. If all bits coincide with each other, the determination result signal 79 as an output from the NOR gate 75 is at level "1" (high). If any one bit data is different, the determination result signal 79 is at level "0" (low). In step S15, coincidence/noncoincidence in data between the two memories is determined in accordance with the determination result signal. If the data coincide with each other, the flow advances to step S18; otherwise, the flow advances to step S16.

More specifically, the determination result data is input to the read control unit 18. If the signal is at level "1" (high), the original read operation is started in step S18. The shading data in the shading memory 58 is used with respect to the video signal from the sensor (CS) 2, thereby performing image processing. This processing is repeated until it is determined in step S19 that no page is present any more.

If the determination result signal 79 is at level "0" (low), it is determined in step S16 whether the image mode is a binary mode or a halftone mode. The binary mode is a mode wherein a received image is binarized and output. The halftone mode is a mode wherein a received image is output as multivalued data. Therefore, in the halftone mode, reference signals at a plurality of levels are required. In the binary mode, in step S17, the shading data switching signal 77 is output from the read control unit 18 to switch the analog switch 76 to the +VCC side, a signal of level "1" (high) is supplied to the analog switch 46, and the flow advances to step S18. With this processing, a shading capacitor 52 is charged with the peak value 42 of the original (image), with which a peak hold capacitor 38 is charged, through the analog switch 46. That is, as a shading waveform for shading correction, a waveform (linear waveform) having a predetermined value is obtained in which the peak value of the original is linearized.

As shown in FIG. 3B, the reference signal has a linear waveform with respect to the peak value of the video signal. In the read control unit 18, the reference signal has a linear waveform, as shown in FIG. 3C. Assume that, in the read control unit 18, the slice level is set to 60% of the reference signal level, as shown in FIG. 3C. If the original in FIG. 3A has portions a and b with black information, the portions a and b are determined as black information portions because their levels are lower than the slice level.

If the image mode is determined as a halftone mode in step S17, the flow advances to step S20, and a halftone mode error is displayed on the display unit 17 shown in FIG. 1. The prescanning operation shown in the flow chart of FIG. 4 is performed again in step S21 to form new shading data. The shading data is held in the shading memory 58 and the memory 71 in the shading data confirming unit 15. Thereafter, the original read operation is performed. Note that the prescanning mode is manually set using an operation panel (not shown), though the prescanning mode may be automatically set in step S21.

As has been described above, according to this embodiment, the prescanning mode for forming shading data is set, and the white reference original is used to form the shading data. With this arrangement, a mechanism for performing the prescanning operation of the read write ground (reference white ground) can be omitted. As a result, the original read mechanism is simplified to allow cost reduction. The reliability of original feeding (e.g., ADF "Auto Document Feeder") can also be increased.

In addition, destruction of shading data can be detected by the shading data confirming unit 15. If destruction is detected, permanent shading data is used. With this arrangement, even when the shading data is destroyed by an abnormal voltage (e.g., thunder surge or static electricity), normal processing can be performed.

Furthermore, when a halftone image is to be processed, and destruction of shading data is detected, the shading data is formed again in the prescanning mode. With this arrangement, image processing of a halftone image can be normally performed.

The present invention may be applied to a system constituted by a plurality of devices such as a host computer, an interface, and a printer, or an apparatus constituted by one device such as a copying machine or a facsimile apparatus. As is apparent, the present invention can also be applied to a case wherein the above-described function is achieved by supplying boards or programs having functions for realizing the means of the present invention to a system or an apparatus. When the functions are provided by programs, the system or the apparatus can obtain the effect of the present invention by reading the recording medium storing the programs represented by software for achieving the present invention in the system or the apparatus.

As many apparently widely different embodiments of the present invention can be made without departing from the spirit and scope thereof, it is to be understood that the invention is not limited to the specific embodiments thereof except as defined in the claims.

What is claimed is:

1. A signal processing apparatus comprising:
   input means for inputting a signal;
   a first memory for storing correction data to correct the signal;
   a second memory for storing the correction data as a backup of the correction data in the first memory;
   verifying means for verifying the correction data in said first memory by comparing the correction data in said first memory to the correction data in said second memory; and
   processing means for performing correction of the signal input by said input means by using the correction data stored in said first memory when said verifying means determines that the correction data stored in said first memory and the correction data stored in said second memory coincide with each other.

2. The apparatus according to claim 1, wherein the signal input by said input means is an image signal.

3. The apparatus according to claim 2, wherein said input means reads the original image to be processed by a line sensor.

4. The apparatus according to claim 2, further comprising protection means for protecting the data stored in said second memory.

5. The apparatus according to claim 2, wherein said processing means performs correction using predetermined data when said verifying means determines that the correction data stored in said first and second memories do not coincide with each other.

6. The apparatus according to claim 5, further comprising determination means for determining whether an image input operation by said input means is performed in a binary mode when said verifying means determines that the correction data stored in said first and second memories do not coincide with each other, and wherein said processing means performs the correction when said determination means determines that the image input operation is performed in a binary mode.

7. The apparatus according to claim 2, wherein said processing means collects data by prescanning when said verifying means determines that the correction data stored in said first and second memories do not coincide with each other.

8. The apparatus according to claim 7, further comprising determination means for determining whether an image input operation by said input means is performed in a halftone mode when said verifying means determines that the correction data stored in said first and second memories do not coincide with each other, and wherein said processing means determines that the image input operation is performed in a halftone mode.

9. A signal processing method comprising:

the input step of inputting a signal;

the first storing step of storing correction data in a first memory;

the second storing step of storing the correction data as a backup of the correction data in a second memory;

the verifying step of verifying the correction data stored in the first memory by comparing the correction data stored in the first memory and the correction stored in the second memory; and the processing step of performing correction of the signal input in the input step by using the correction data stored in the first memory when said verifying means determines that the correction data stored in the first memory and the correction data stored in the second memory coincide with each other.

10. The method according to claim 9, wherein the signal input in said input step is an image signal.

11. The method according to claim 10, wherein the input step comprises reading the original image to be processed by a line sensor.

12. The method according to claim 10, further comprising the protect step of protecting the correction data stored in said second memory.

13. The method according to claim 10, wherein the processing step comprises performing correction using predetermined data when it is determined in the verifying step that the correction data stored in said first and second memories do not coincide with each other.

14. The method according to claim 13, further comprising the determination step of determining whether an image input operation in the input step is performed in a binary mode when it is determined in the verifying step that the correction data stored in said first and second memories do not coincide with each other, and wherein the processing step comprises performing the correction when it is determined in the determination step that the image read operation is performed in a binary mode.

15. The method according to claim 10, wherein the processing step comprises collecting data by prescanning when it is determined in the verifying step that the correction data stored in said first and second memories do not coincide with each other.

16. The method according to claim 15, further comprising the determination step of determining whether an image input operation in the input step is performed in a halftone mode when it is determined in the verifying step that the correction data stored in said first and second memories do not coincide with each other, and wherein the processing step comprises performing the correction when it is determined in the determination step that the image read operation is performed in a halftone mode.

* * * * *